(12) United States Patent
Wong et al.

(10) Patent No.: US 7,186,762 B2
(45) Date of Patent: Mar. 6, 2007

(54) PROCESSES FOR PREPARING PHASE CHANGE INKS

(75) Inventors: Raymond W. Wong, Mississauga (CA); Hadi K. Mahabadi, Mississauga (CA); Paul F. Smith, Oakville (CA); Sheau V. Kao, Oakville (CA); Michael S. Hawkins, Cambridge (CA); Caroline M. Turek, Hamilton (CA)

(73) Assignee: Xerox Corporation, Stamford, CT (US)

( * ) Notice: Subject to any disclaimer, the term of this patent is extended or adjusted under 35 U.S.C. 154(b) by 525 days.

(21) Appl. No.: 10/721,851

(22) Filed: Nov. 25, 2003

(65) Prior Publication Data

US 2005/0113482 A1    May 26, 2005

(51) Int. Cl.
C09D 11/02 (2006.01)
C09D 11/10 (2006.01)
C08L 39/04 (2006.01)
B29C 47/00 (2006.01)
B29C 47/38 (2006.01)

(52) U.S. Cl. .............. 523/160; 106/31.61; 264/211; 264/211.21; 524/548

(58) Field of Classification Search .......... 523/160, 523/161
See application file for complete search history.

(56) References Cited

U.S. PATENT DOCUMENTS

| | | | |
|---|---|---|---|
| 3,653,932 A | 4/1972 | Berry et al. ............ 106/22 |
| 4,390,369 A | 6/1983 | Merritt et al. .......... 106/31 |
| 4,484,948 A | 11/1984 | Merritt et al. .......... 106/31 |
| 4,684,956 A | 8/1987 | Ball ........................ 346/1.1 |
| 4,851,045 A | 7/1989 | Taniguchi ............... 106/31 |
| 4,889,560 A | 12/1989 | Jaeger et al. ........... 106/27 |
| 4,889,761 A | 12/1989 | Titterington et al. ... 428/195 |
| 5,006,170 A | 4/1991 | Schwarz et al. ........ 106/20 |
| 5,151,120 A | 9/1992 | You et al. ................ 106/27 |
| 5,164,232 A * | 11/1992 | Henseleit et al. ....... 427/288 |
| 5,221,335 A | 6/1993 | Williams et al. ........ 106/23 |
| 5,372,852 A | 12/1994 | Titterington et al. ... 427/288 |
| 5,409,530 A * | 4/1995 | Kanbayashi et al. .... 106/31.29 |
| 5,496,879 A | 3/1996 | Griebel et al. .......... 524/320 |
| 5,574,078 A * | 11/1996 | Elwakil .................. 523/161 |
| 5,593,486 A * | 1/1997 | Oliver et al. ............ 524/96 |
| 5,621,022 A | 4/1997 | Jaeger et al. ........... 523/161 |
| 5,720,802 A | 2/1998 | Wong et al. ............ 106/31.65 |
| 5,782,966 A | 7/1998 | Bui et al. ............... 106/31.43 |
| 5,800,600 A | 9/1998 | Lima-Marques et al. ............ 106/31.29 |
| 5,902,841 A | 5/1999 | Jaeger et al. ........... 523/161 |
| 5,906,678 A * | 5/1999 | Fujiyama et al. ....... 106/31.29 |
| 5,994,453 A | 11/1999 | Banning et al. ........ 524/590 |
| 6,174,937 B1 | 1/2001 | Banning et al. ........ 523/160 |
| 6,180,692 B1 | 1/2001 | Bridgeman et al. |
| 6,309,453 B1 | 10/2001 | Banning et al. ........ 106/31.29 |
| 6,380,423 B2 | 4/2002 | Banning et al. ........ 560/158 |
| 6,494,943 B1 * | 12/2002 | von Gottberg et al. .. 106/31.65 |
| 6,858,070 B1 * | 2/2005 | Wong et al. ............ 106/31.61 |
| 6,878,198 B1 * | 4/2005 | Drappel et al. ......... 106/31.61 |

FOREIGN PATENT DOCUMENTS

| | | |
|---|---|---|
| EP | 0187352 | 7/1986 |
| EP | 0206286 | 12/1986 |
| EP | 1 335 006 A1 | 8/2003 |
| WO | WO 94/04619 | 3/1994 |

OTHER PUBLICATIONS

German Patent Publication DE 4205636AL.
German Patent Publication DE 4205713AL.

* cited by examiner

Primary Examiner—Callie Shosho
(74) Attorney, Agent, or Firm—Judith L. Bgorick

(57) ABSTRACT

Disclosed is a process for preparing a phase change ink composition which comprises (a) a phase change ink carrier, said carrier comprising at least one nonpolar component and at least one polar component, and (b) pigment particles, said process comprising (1) selecting at least one of the polar carrier components to be a pigment particle dispersant; (2) admixing the pigment particles with the dispersant; (3) extruding the mixture of pigment particles and dispersant in an extruder at a temperature that is at or above about the peak crystallization temperature of the dispersant and below about the peak melting temperature of the dispersant, thereby forming a pigment dispersion; (4) subsequent to extrusion of the pigment dispersion, adding to the pigment dispersion any remaining polar components and the nonpolar component; and (5) subjecting the resulting mixture of pigment dispersion, polar component, and nonpolar component to high shear mixing to form an ink.

80 Claims, No Drawings

PROCESSES FOR PREPARING PHASE CHANGE INKS

Cross-reference is hereby made to the following applications:

Copending application U.S. Ser. No. 10/722,164, now U.S. Patent 6,878,198, filed concurrently herewith, entitled "Phase Change Inks and Process for the Preparation Thereof," with the named inventors Stephan V. Drappel, Marcel P. Breton, James D. Mayo, Raymond W. Wong, Christine E. Bedford, Danielle C. Boils-Boissier, Sandra J. Gardner, and Paul F. Smith, the disclosure of which is totally incorporated herein by reference, discloses phase change ink compositions comprising (a) an ink carrier comprising a monoamide and a tetra-amide, and (b) pigment particles having oxygen-containing functional groups on the surfaces thereof. Also, processes for preparing a phase change ink which comprise (a) melting a tetra-amide which is solid at about 25° C.; (b) admixing with the molten tetra-amide pigment particles having oxygen-containing functional groups on the surfaces thereof; (c) maintaining the mixture of pigment and tetra-amide at a temperature of at least about 100° C. and at a temperature of no more than about 200° C. for a period sufficient to enable the molten tetra-amide to wet the pigment particle surfaces; (d) subsequent to wetting of the pigment particle surfaces with the molten tetra-amide, adding to the mixture a monoamide; (e) subsequent to addition of the monoamide, subjecting the resulting mixture to high shear mixing; and (f) subsequent to subjecting the mixture to high shear mixing, optionally adding to the mixture additional ink ingredients.

Copending application U.S. Serial No. 10/722,162, now U.S. Patent 6,858,070, filed concurrently herewith, entitled "Phase Change Inks," with the named inventors Raymond W. Wong, Stephan V. Drappel, Paul F. Smith, C. Geoffrey Allen, and Caroline M. Turek, the disclosure of which is totally incorporated herein by reference, discloses an ink composition comprising (a) an ink carrier which comprises a monoamide, a tetra-amide, or a mixture thereof; (b) a polyalkylene succinimide; and (c) pigment particles. Also disclosed is an ink composition comprising (a) an ink carrier, (b) a polyalkylene succinimide, and (c) pigment particles, said ink having a conductivity greater than $1 \times 10^{-8}$ Siemens per centimeter. Also disclosed is an ink set comprising (1) a first ink comprising (a) an ink carrier, (b) a polyalkylene succinimide, and (c) pigment particles, and (2) a second ink comprising a dye colorant and a second ink carrier, wherein the first ink carrier contains substantially the same components as the second ink carrier.

BACKGROUND

Disclosed herein are methods for preparing phase change inks. More specifically, disclosed herein are methods for preparing phase change inks containing an ink carrier and a pigment colorant. One embodiment is directed to a process for preparing a phase change ink composition which comprises (a) a phase change ink carrier, said carrier comprising at least one nonpolar component and at least one polar component, and (b) pigment particles, said process comprising (1) selecting at least one of the polar carrier components to be a pigment particle dispersant; (2) admixing the pigment particles with the dispersant; (3) extruding the mixture of pigment particles and dispersant in an extruder at a temperature that is at or above about the peak crystallization temperature of the dispersant and below about the peak melting temperature of the dispersant, thereby forming a pigment dispersion; (4) subsequent to extrusion of the pigment dispersion, adding to the pigment dispersion any remaining polar components and the nonpolar component; and (5) subjecting the resulting mixture of pigment dispersion, polar component, and nonpolar component to high shear mixing to form an ink.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking and industrial marking and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 4,889,560 (Jaeger et al.), the disclosure of which is totally incorporated herein by reference, discloses a phase change ink carrier composition combined with a compatible colorant to form a phase change ink composition. A thin film of substantially uniform thickness of that phase change ink carrier composition, and the ink produced therefrom, has a high degree of lightness and chroma. The thin films of a substantially uniform thickness of the ink composition are also rectilinearly light transmissive. The carrier composition is preferably a fatty amide-containing compound.

U.S. Pat. No. 4,889,761 (Titterington et al.), the disclosure of which is totally incorporated herein by reference, discloses a method for producing a light-transmissive phase change ink printed substrate is described which comprises providing a substrate, and then printing on at least one surface of the substrate a predetermined pattern of a light-transmissive phase change ink which initially transmits light in a non-rectilinear path. The pattern of solidified phase change ink is then reoriented to form an ink layer of substantially uniform thickness. This ink layer will, in turn, produce an image which then will transmit light in a substantially rectilinear path. In one aspect of the invention, the substrate is light transmissive, and the reoriented printed substrate exhibits a high degree of lightness and chroma, and transmits light in a substantially rectilinear path. In this way, the reoriented printed substrate can be used in a projection device to project an image containing clear, saturated colors.

U.S. Pat. No. 5,372,852 (Titterington et al.), the disclosure of which is totally incorporated herein by reference, discloses a phase change ink composition that is indirectly applied to a substrate by raising the temperature of the phase change ink composition to form a liquid phase change ink composition, applying droplets of the phase change ink composition in a liquid phase to a liquid intermediate transfer surface on a solid support in a pattern using a device such as an ink jet printhead, solidifying the phase change ink composition on the liquid intermediate transfer surface, transferring the phase change ink composition from the liquid intermediate transfer surface to the substrate, and fixing the phase change ink composition to the substrate. The phase change ink composition is malleable when the ink is transferred from the intermediate transfer surface to the substrate and is ductile after the ink has been transferred to the substrate and cooled to ambient temperature to preclude the ink from crumbling and cracking.

U.S. Pat. No. 5,621,022 (Jaeger et al.), the disclosure of which is totally incorporated herein by reference, discloses a phase change ink composition wherein the ink composition utilizes polymeric dyes in combination with a selected phase change ink carrier composition.

U.S. Pat. No. 5,782,966 (Bui et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,902,841 (Jaeger et al.), the disclosure of which is totally incorporated herein by reference, discloses a phase change ink composition wherein the ink composition utilizes colorant in combination with a selected phase change ink carrier composition containing at least one hydroxy-functional fatty amide compound.

U.S. Pat. No. 5,994,453 (Banning et al.), the disclosure of which is totally incorporated herein by reference, discloses phase change carrier compositions made from the combination of at least one urethane resin; at least one urethane/urea resin; at least one mono-amide; and at least one polyethylene wax. The order of addition of the reactants to form the reactant product urethane resin and urethane/urea resin permits the tailoring or design engineering of desired properties.

U.S. Pat. No. 6,174,937 (Banning et al.), the disclosure of which is totally incorporated herein by reference, discloses a phase change ink comprising a material of the formula

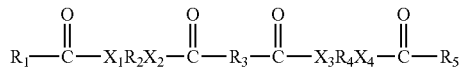

wherein $X_1$, $X_2$, $X_3$, and $X_4$ are segments comprising atoms selected from groups V and VI of the periodic table; wherein at least one $R_1$ and $R_5$ comprises at least 37 carbon units; and wherein $R_2$, $R_3$, and $R_4$ each comprise at least one carbon unit. The invention further encompasses a composition of matter, as well as methods of reducing coefficients of friction of phase change ink formulations.

U.S. Pat. No. 6,309,453 (Banning et al.), the disclosure of which is totally incorporated herein by reference, discloses colorless compounds having a central core and at least two arms extending from the core. The core can comprise one or more atoms. The at least two arms have the formula

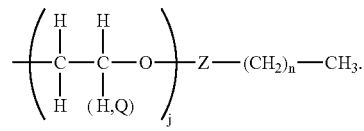

In such formula, Z is a segment of one or more atoms; j is an integer from 1 to about 300 and can be different at one of the at least two arms than at another of the at least two arms; Q is an alkyl or aryl group and can vary amongst different alkyl and aryl groups within the colorless compound; and n is an integer greater than 1 and can be different at one of the at least two arms than at another of the at least two arms. In other aspects, the invention encompasses phase change inks incorporating the above-described colorless compound as toughening agent, and methods of printing with such phase change inks. The invention further includes a solid ink comprising a colorant and a colorless compound of the formula

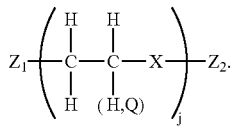

In such formula, X is a single atom corresponding to N or O; $Z_1$ and $Z_2$ are substituents comprising one or more atoms, and can be the same as one another or different from one another; and j is an integer from 1 to about 50.

U.S. Pat. No. 6,380,423 (Banning et al.), the disclosure of which is totally incorporated herein by reference, discloses colorless compounds having a central core and at least two arms extending from the core. The core can comprise one or more atoms. The at least two arms have the formula

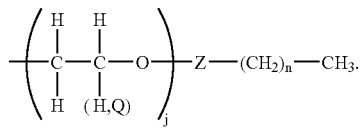

In such formula, Z is a segment of one or more atoms; j is an integer from 1 to about 300 and can be different at one of the at least two arms than at another of the at least two arms; Q is an alkyl or aryl group and can vary amongst different alkyl and aryl groups within the colorless compound; and n is an integer greater than 1 and can be different at one of the at least two arms than at another of the at least two arms. In other aspects, the invention encompasses phase change inks incorporating the above-described colorless compound as toughening agent, and methods of printing with such phase change inks. The invention further includes a solid ink comprising a colorant and a colorless compound of the formula

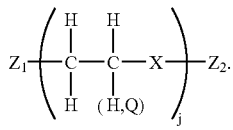

In such formula, X is a single atom corresponding to N or O; $Z_1$ and $Z_2$ are substituents comprising one or more atoms, and can be the same as one another or different from one another; and j is an integer from 1 to about 50.

U.S. Pat. No. 5,221,335 (Williams et al.), the disclosure of which is totally incorporated herein by reference, discloses a stabilized pigmented hot melt ink containing a thermoplastic vehicle, a coloring pigment, and a dispersion-stabilizing agent to inhibit settling or agglomeration of the pigment when the ink is molten, comprising 1.5 to 20 weight percent of a nitrogen-modified acrylate polymer. A preferred dispersion-stabilizing agent is the nitrogen-modified methacrylate polymer marketed by Rohm and Haas as Plexol 1525.

U.S. Pat. No. 5,800,600 (Lima-Marquez et al.), the disclosure of which is totally incorporated herein by reference, discloses a solid ink jet ink composition which is suitable for hot melt applications having a carrier having an electrical resistivity of at least $10^8$ Ohm.cm, insoluble marking particles, and a particle charging agent dispersed in it. The marking particle may be a pigment, an insoluble dyestuff, a polymer, or mixture thereof. The particle charging agent may be a metal soap, a fatty acid, lecithin, an organic phosphorous compound, a succinimide, a sulfosuccinate, petroleum sulfonates, a soluble or partially soluble resin such as a modified rosin ester, an acrylic, a vinyl, a hydrocarbon, or a mixture thereof. The solid ink jet ink composition may further include a viscosity controller. The ink may be capable of being heated to 155° C. and have at that temperature a viscosity of between 5 to 150 centipoise.

While known compositions and processes are suitable for their intended purposes, a need remains for improved phase change inks. In addition, a need remains for phase change inks having pigment colorants. Further, a need remains for phase change inks having pigment colorants wherein the pigment particles are stable and uniformly dispersed within the ink formulation. Additionally, a need remains for ink sets of different colored inks wherein some inks have pigment colorants and some inks have dye colorants, and wherein the other ink components remain the same for both the pigment-based inks and the dye-based inks. There is also a need for phase change inks containing pigment colorants that have increased stability and lightfastness at elevated temperatures, thereby enabling improved fade resistance upon exposure to heat and/or light. In addition, there is a need for phase change inks containing pigment colorants that exhibit reduced diffusion of the colorant from the ink to paper, thereby enabling reduced showthrough. Further, there is a need for phase change inks containing pigment colorants that exhibit reduced diffusion of colorants from image areas of one color to image areas of another color, thereby enabling improved image quality. Additionally, there is a need for phase change inks containing pigment colorants wherein the pigment colorants exhibit reduced agglomeration and settling in the ink when the ink is exposed to prolonged and/or excessive heating conditions, such as the temperatures (typically at least about 110° C., and frequently at least about 135° C.) and time periods (typically at least a day, and frequently at least a week) to which phase change inks are exposed in phase change ink jet printers. A need also remains for phase change inks containing pigment colorants that exhibit reduced clogging of jets in the printhead and reduced printhead failure that might be caused by agglomeration of the pigment colorant in the ink. In addition, a need remains for methods for preparing phase change inks containing pigment colorants wherein relatively high viscosity formulations can be processed effectively under high shear conditions.

SUMMARY

Disclosed herein is a process for preparing a phase change ink composition which comprises (a) a phase change ink carrier, said carrier comprising at least one nonpolar component and at least one polar component, and (b) pigment particles, said process comprising (1) selecting at least one of the polar carrier components to be a pigment particle dispersant; (2) admixing the pigment particles with the dispersant; (3) extruding the mixture of pigment particles and dispersant in an extruder at a temperature that is at or above about the peak crystallization temperature of the dispersant and below about the peak melting temperature of the dispersant, thereby forming a pigment dispersion; (4) subsequent to extrusion of the pigment dispersion, adding to the pigment dispersion any remaining polar components and the nonpolar component; and (5) subjecting the resulting mixture of pigment dispersion, polar component, and nonpolar component to high shear mixing to form an ink.

DETAILED DESCRIPTION

The inks comprise an ink carrier and pigment particles.

Examples of suitable ink carrier materials include fatty amides, such as monoamides, tetra-amides, mixtures thereof, and the like. Suitable monoamides include both solid and liquid monoamides, provided that the ink containing the mixture of all ingredients is solid at room temperature (typically from about 20 to about 25° C.). In one specific embodiment, the monoamide has a melting point of at least about 50° C., although the melting point can be below this temperature. In another specific embodiment, the monoamide has a melting point of no more than about 100° C., although the melting point can be above this temperature. Some specific examples of suitable monoamides include (but are not limited to) primary monoamides and secondary monoamides. Stearamide, such as KEMAMIDE S available from Witco Chemical Company and CRODAMIDE S available from Croda, behenamide, such as KEMAMIDE B available from Witco and CRODAMIDE BR available from Croda, oleamide, such as KEMAMIDE U available from Witco and CRODAMIDE OR available from Croda, technical grade oleamide, such as KEMAMIDE O available from Witco, CRODAMIDE O available from Croda, and UNISLIP 1753 available from Uniqema, and erucamide such as KEMAMIDE E available from Witco and CRODAMIDE ER available from Croda, are some examples of suitable primary amides. Behenyl behenamide, such as KEMAMIDE EX666 available from Witco, stearyl stearamide, such as KEMAMIDE S-180 and KEMAMIDE EX-672 available from Witco, stearyl erucamide, such as KEMAMIDE E-180 available from Witco and CRODAMIDE 212 available from Croda, erucyl erucamide, such as KEMAMIDE E-221 available from Witco, oleyl palmitamide, such as KEMAMIDE P-181 available from Witco and CRODAMIDE 203 available from Croda, and erucyl stearamide, such as KEMAMIDE S-221 available from Witco, are some examples of secondary amides. In one specific embodiment, the monoamide is of the formula

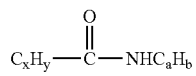

wherein x is an integer of from about 5 to about 21, y is an integer of from about 11 to about 43, a is an integer of from about 6 to about 22, and b is an integer of from about 13 to about 45. Mixtures of two or more monoamides can also be present in the ink.

The monoamide is present in the ink carrier in any desired or effective amount, in one embodiment at least about 8 percent by weight, in another embodiment at least about 10 percent by weight, and in yet another embodiment at least about 12 percent by weight, and in one embodiment no more than about 70 percent by weight, in another embodiment no more than about 60 percent by weight, in yet another embodiment no more than about 50 percent by weight, in still another embodiment no more than about 32 percent by weight, in another embodiment no more than about 28 percent by weight, and in yet another embodiment no more than about 25 percent by weight, although the amount can be outside of these ranges.

Suitable tetra-amides include both solid and liquid tetra-amides, provided that the ink containing the mixture of all ingredients is solid at room temperature (typically from about 20 to about 25° C.). One specific class of suitable tetra-amides is that encompassed by the formula

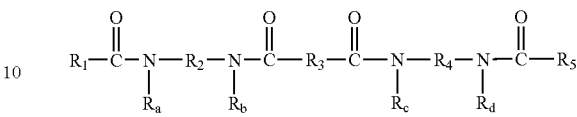

wherein $R_a$, $R_b$, $R_c$, and $R_d$ each, independently of the others, is (a) a hydrogen atom, (b) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 100 carbon atoms, and in another embodiment with no more than about 50 carbon atoms, although the number of carbon atoms can be outside of these ranges, (c) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 100 carbon atoms, and in another embodiment with no more than about 50 carbon atoms, although the number of carbon atoms can be outside of these ranges, (d) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 100 carbon atoms, and in another embodiment with no more than about 50 carbon atoms, although the number of carbon atoms can be outside of these ranges, such as benzyl or the like, or (e) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 100 carbon atoms, and in another embodiment with no more than about 50 carbon atoms, although the number of carbon atoms can be outside of these ranges, such as tolyl or the like, wherein $R_2$, $R_3$, and $R_4$ each, independently of the others, are (a) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, (b) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 5 carbon atoms, and in another embodiment with at least about 6 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, (c) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, or (d) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, and wherein $R_1$ and $R_5$ each, independently of the other, is (a) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, in still another embodiment with at least about 8 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, (b) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, in another embodiment with at least about 6 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, (c) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, in another embodiment with at least about 7 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, such as benzyl or the like, or (d) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, in another embodiment with at least about 7 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, such as tolyl or the like, wherein the substituents on the substituted alkyl, aryl, arylalkyl, alkylaryl, alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylic acid groups, mixtures thereof, and the like, wherein two or more substituents can be joined together to form a ring. In one specific embodiment, one or both of $R_1$ and $R_5$ are alkyl groups with about 18 carbon atoms. In another specific embodiment, one or both of $R_1$ and $R_5$ are alkyl groups with at least about 37 carbon atoms. In yet another specific embodiment, one or both of $R_1$ and $R_5$ are alkyl groups with about 48 carbon atoms. In still another specific embodiment, $R_1$ and $R_5$ are both —$(CH_2)_{16}CH_3$, $R_2$ and $R_4$ are each —$CH_2CH_2$—, and $R_3$ is a branched unsubstituted alkyl group having about 34 carbon atoms. In another specific embodiment, $R_1$ and $R_5$ are both —$(CH_2)_nCH_3$ wherein n is 47 or 48, $R_2$ and $R_4$ are each —$CH_2CH_2$—, and $R_3$ is a branched unsubstituted alkyl group having about 34 carbon atoms.

Tetra-amides can be prepared as disclosed in, for example, U.S. Pat. No. 6,174,937, the disclosure of which is totally incorporated herein by reference. One specific example of a suitable tetra-amide is a tetra-amide resin obtained from the reaction of one equivalent of a C-36 dimer acid obtained from Uniqema, New Castle, De with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference.

The tetra-amide is present in the ink carrier in any desired or effective amount, in one embodiment at least about 10 percent by weight, in another embodiment at least about 13 percent by weight, and in yet another embodiment at least about 16 percent by weight, and in one embodiment no more than about 32 percent by weight, in another embodiment no more than about 27 percent by weight, and in yet another embodiment no more than about 22 percent by weight, although the amount can be outside of these ranges.

Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference.

Also suitable as components in the phase change ink carrier are isocyanate-derived resins and waxes, such as urethane isocyanate-derived materials, urea isocyanate-derived materials, urethane/urea isocyanate-derived materials, mixtures thereof, and the like. One specific example of a suitable isocyanate-derived material is a urethane resin derived from the reaction of two equivalents of hydroabietyl alcohol and one equivalent of isophorone diisocyanate. Materials of this kind can be prepared as described in, for example, Example 1 of U.S. Pat. No. 5,782,966, the disclosure of which is totally incorporated herein by reference. Another specific example of a suitable isocyanate-derived material is a material that is the adduct of three equivalents of stearyl isocyanate and a glycerol propoxylate such as ARCOL® LHT. Materials of this kind can be prepared as described in, for example, Example 4 of U.S. Pat. No. 6,309,453, the disclosure of which is totally incorporated herein by reference. Yet another specific example of a suitable isocyanate-derived material is a material that is the product of the reaction of about 1.5 parts hydroabietyl alcohol, about 0.5 part octadecyl amine, and about 1 part isophorone diisocyanate. Materials of this kind can be prepared as described in, for example, Example 2 of Copending application U.S. Ser. No. 08/672,816, the disclosure of which is totally incorporated herein by reference. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO97/33943, and PCT Publication WO95/04760, the disclosures of each of which are totally incorporated herein by reference.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

In one specific embodiment, the phase change ink carrier comprises (a) a polyethylene wax, present in the carrier in an amount in one embodiment of at least about 25 percent by weight, in another embodiment of at least about 30 percent by weight, and in yet another embodiment of at least about 37 percent by weight, and in one embodiment of no more than about 60 percent by weight, in another embodiment of no more than about 53 percent by weight, and in yet another embodiment of no more than about 48 percent by weight, although the amount can be outside of these ranges; (b) a stearyl stearamide wax, present in the carrier in an amount in one embodiment of at least about 8 percent by weight, in another embodiment of at least about 10 percent by weight, and in yet another embodiment of at least about 12 percent by weight, and in one embodiment of no more than about 32 percent by weight, in another embodiment of no more than about 28 percent by weight, and in yet another embodiment of no more than about 25 percent by weight, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the carrier in an amount in one embodiment of at least about 10 percent by weight, in another embodiment of at least about 13 percent by weight, and in yet another embodiment of at least about 16 percent by weight, and in one embodiment of no more than about 32 percent by weight, in another embodiment of no more than about 27 percent by weight, and in yet another embodiment of no more than about 22 percent by weight, although the amount can be outside of these ranges; (d) a urethane resin derived from the reaction of two equivalents of hydroabietyl alcohol and one equivalent of isophorone diisocyanate, present in the carrier in an amount in one embodiment of at least about 6 percent by weight, in another embodiment of at least about 8 percent by weight, and in yet another embodiment of at least about 10 percent by weight, and in one embodiment of no more than about 16 percent by weight, in another embodiment of no more than about 14 percent by weight, and in yet another embodiment of no more than about 12 percent by weight, although the amount can be outside of these ranges; (e) a urethane resin that is the adduct of three equivalents of stearyl isocyanate and a glycerol-based alcohol, present in the carrier in an amount in one embodiment of at least about 2 percent by weight, in another embodiment of at least about 3 percent by weight, and in yet another embodiment of at least about 4.5 percent by weight, and in one embodiment of no more than about 13 percent by weight, in another embodiment of no more than about 10 percent by weight, and in yet another embodiment of no more than about 7.5 percent by weight, although the amount can be outside of these ranges; and (f) an antioxidant, present in the carrier in an amount in one embodiment of at least about 0.01 percent by weight, in another embodiment of at least about 0.05 percent by weight, and in yet another embodiment of at least about 0.1 percent by weight, and in one embodiment of no more than about 1 percent by weight, in another embodiment of no more than about 0.5 percent by weight, and in yet another embodiment of no more than about 0.3 percent by weight, although the amount can be outside of these ranges.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

In one specific embodiment, the inks also optionally contain a polyalkylene succinimide. Suitable polyalkylene succinimides include (but are not limited to) those of the general formula

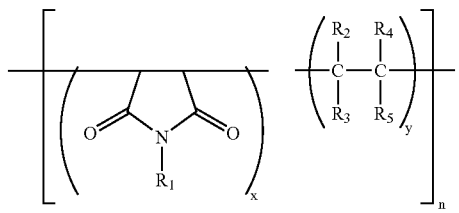

wherein x is an integer representing the number of repeat succinimide units, and is in one embodiment from 1 to about 3, y is an integer representing the number of repeat alkylene units, and is in one embodiment from 1 to about 3, n is an integer, in one embodiment at least about 2, in another embodiment at least about 10, and in yet another embodiment at least about 50, and in one embodiment no more than about 500, in another embodiment no more than about 300, and in yet another embodiment no more than about 100, although the values of x, y, and n can be outside of these ranges, $R_1$ is an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, in another embodiment with at least about 10 carbon atoms, and in yet another embodiment with at least about 30 carbon atoms, and in one embodiment with no more than about 100 carbon atoms, in another embodiment with no more than about 50 carbon atoms, and in yet another embodiment with no more than about 40 carbon atoms, although the number of carbon atoms can be outside of these ranges, an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 4 carbon atoms, in another embodiment with at least about 5 carbon atoms, and in yet another embodiment with at least about 6 carbon atoms, and in one embodiment with no more than about 100 carbon atoms, in another embodiment with no more than about 50 carbon atoms, and in yet another embodiment with no more than about 40 carbon atoms, although the number of carbon atoms can be outside of these ranges, an arylalkyl group (including substituted and unsubstituted arylalkyl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the arylalkyl group), in one embodiment with at least about 5 carbon atoms, in another embodiment with at least about 6 carbon atoms, and in yet another embodiment with at least about 7 carbon atoms, and in one embodiment with no more than about 100 carbon atoms, in another embodiment with no more than about 50 carbon atoms, and in yet another embodiment with no more than about 40 carbon atoms, although the number of carbon atoms can be outside of these ranges, such as benzyl or the like, or an alkylaryl group (including substituted and unsubstituted alkylaryl groups, and wherein the alkyl portion thereof can be linear, branched, cyclic, saturated, or unsaturated, and wherein hetero atoms, such as oxygen, nitrogen, sulfur, silicon, phosphorus, and the like either may or may not be present in either or both of the aryl portion and the alkyl portion of the alkylaryl group), in one embodiment with at least about 5 carbon atoms, in another embodiment with at least about 6 carbon atoms, and in yet another embodiment with at least about 7 carbon atoms, and in one embodiment with no more than about 100 carbon atoms, in another embodiment with no more than about 50 carbon atoms, and in yet another embodiment with no more than about 40 carbon atoms, although the number of carbon atoms can be outside of these ranges, such as tolyl or the like, and $R_2$ $R_3$, $R_4$, and $R_5$ each, independently of the others, is a hydrogen atom or an alkyl group (including linear, branched, cyclic, saturated, unsaturated, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 30 carbon atoms, in another embodiment with no more than about 20 carbon atoms, in yet another embodiment with no more than about 10 carbon atoms, and in still another embodiment with no more than about 5 carbon atoms, although the number of carbon atoms can be outside of these ranges, and wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. In one specific embodiment, $R_2$, $R_3$, and $R_4$ are hydrogen atoms and $R_5$ is an alkyl group. In another specific embodiment, $R_2$ and $R_3$ are hydrogen atoms and $R_4$ and $R_5$ are methyl groups. Examples of suitable polyalkylene succinimides include polyisobutylene succinimide and the like. Examples of commercially available polyalkylene succinimides include the Chevron Oronite OLOA 11000, OLOA 11001, OLOA 11002, OLOA 11005, OLOA 371, OLOA 375, OLOA 411, OLOA 4500, OLOA 4600, OLOA 8800, OLOA 8900, OLOA 9000, OLOA 9100, OLOA 9200, and the like, available from Chevron Oronite Company LLC, Houston, Tex., and the like, as well as mixtures thereof. Examples of suitable polyalkylene succinimides and their precursors and methods of making them are also disclosed in, for example, U.S. Pat. No. 3,172,892, U.S. Pat. No. 3,202,678, U.S. Pat. No. 3,280,034, U.S. Pat. No. 3,442,808, U.S. Pat. No. 3,361,673, U.S. Pat. No. 3,172,892, U.S. Pat. No. 3,912,764, U.S. Pat. No. 5,286,799, U.S. Pat. No. 5,319,030, U.S. Pat. No. 3,219,666, U.S. Pat. No. 3,381,022, U.S. Pat. No. 4,234,435, and European Patent Publication 0 776 963, the disclosures of each of which are totally incorporated herein by reference.

When present, the optional polyalkylene succinimide is present in the ink in any desired or effective amount, in one embodiment at least about $1 \times 10^{-7}$ percent by weight of the ink, in another embodiment at least about $1 \times 10^{-5}$ percent by weight of the ink, in yet another embodiment at least about 0.001 percent by weight of the ink, in still another embodiment at least about 0.005 percent by weight of the ink, and in another embodiment at least about 0.01 percent by weight of the ink, and in one embodiment no more than about 40 percent by weight of the ink, in another embodiment no more than about 30 percent by weight of the ink, in yet another embodiment no more than about 20 percent by weight of the ink, and in still another embodiment no more than about 10 percent by weight of the ink, although the amount can be outside of these ranges. The effective amount of polyalkylene succinimide in the ink can vary depending on the physical and chemical characteristics of the pigment particles, such as aggregate size, surface area, density of functional groups on the particle surfaces, quality of the interaction between the pigment particles and the ink carrier or components thereof, and many other such considerations.

The inks also contain a pigment colorant. The pigment particles can be of any desired color, including (but not limited to) black, cyan, magenta, yellow, red, blue, green, brown, gold, gray, purple, orange, pink, and the like, as well as mixtures thereof. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871 K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2GO1 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange Oreg. 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as SPECIAL BLACK 100, SPECIAL BLACK 250, SPECIAL BLACK 350, FW1, FW2 FW200, FW18, SPECIAL BLACK 4, NIPEX 150, NIPEX 160, NIPEX 180, SPECIAL BLACK 5, SPECIAL BLACK 6, PRINTEX 80, PRINTEX 90, PRINTEX 140, PRINTEX 150T, PRINTEX 200, PRINTEX U, and PRINTEX V, all available from Degussa, MOGUL L, REGAL 400R, REGAL 330, and MONARCH 900, available from Cabot Chemical Co., MA77, MA7, MA8, MA11, MA100, MA100R, MA100S, MA230, MA220, MA200RB, MA14, #2700B, #2650, #2600, #2450B, #2400B, #2350, #2300, #2200B, #1000, #970, #3030B, and #3230B, all available from Mitsubishi, RAVEN 2500 ULTRA, Carbon Black 5250, and Carbon Black 5750 available from Columbia Chemical Co., and the like. In a specific embodiment, the pigment particles have acidic or basic functional groups on the surfaces thereof.

The pigment is present in the phase change ink in any desired or effective amount to obtain the desired color or hue, in one embodiment at least about 0.1 percent by weight of the ink, in another embodiment at least about 0.2 percent by weight of the ink, and in yet another embodiment at least about 0.5 percent by weight of the ink, and in one embodiment no more than about 50 percent by weight of the ink, in another embodiment no more than about 20 percent by weight of the ink, and in yet another embodiment no more than about 10 percent by weight of the ink, although the amount can be outside of these ranges.

If so desired, dyes can also optionally be included in the inks as auxiliary colorants. Examples of suitable dyes include Color Index (C.I.) Solvent Dyes, Disperse Dyes, modified Acid and Direct Dyes, Basic Dyes, Sulphur Dyes, Vat Dyes, and the like. Specific examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red.3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Also suitable as dyes for the ink are the colorants disclosed in U.S. Pat. No. 6,472,523, Copending Application U.S. Ser. No. 10/072,210, filed Feb. 8, 2002, entitled "Ink Compositions Containing Phthalocyanines," U.S. Pat. No. 6,476,219, U.S. Pat. No. 6,576,747, Copending Application U.S. Ser. No. 10/185,994, filed Jun. 27, 2002, entitled "Dimeric Azo Pyridone Colorants," Copending Application U.S. Ser. No. 10/184,269, filed Jun. 27, 2002, entitled "Phase Change Inks Containing Dimeric Azo Pyridone Colorants," Copending Application U.S. Ser. No. 10/185,264, filed Jun. 27, 2002, entitled "Phase Change Inks Containing Azo Pyridone Colorants," U.S. Pat. No. 6,590,082, Copending Application U.S. Ser. No. 10/185,597, filed Jun. 27, 2002, entitled "Process for Preparing Substituted Pyridone Compounds," U.S. Pat. No. 6,576,748, U.S. Pat. No. 6,646,111, Copending Application U.S. Ser. No. 10/184,266, filed Jun. 27, 2002, entitled "Phase Change Inks Containing Dimeric Azo Pyridone Colorants," Copending Application U.S. Ser. No. 10/260,146, filed Sep. 27, 2002, entitled "Colorant Compounds," with the named inventors Jeffery H. Banning and C. Wayne Jaeger, and Copending Application U.S. Ser. No. 10/260,379, filed Sep. 27, 2002, entitled "Methods for Making Colorant Compounds," with the named inventors C. Wayne Jaeger and Jeffery H. Banning, the disclosures of each of which are totally incorporated herein by reference.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 10, NAUGUARD® 524, NAUGUARD® 76, NAUGUARD® 512, NAUGUARD® XL-1, and NAUGUARD® HM-22, commercially available from Uniroyal Chemical Company, Oxford, Conn., CGL 545, IRGACOR® 252 FC, IRGANOX® 1010, IRGANOX® 1035, IRGANOX® B 900, IRGANOX® 1330 FF, IRGANOX® MD 1024, IRGANOX® 3114, IRGAROL® 1051, IRGAFOS® 38, IRGAFOS® 168, TINUVIN® 111 FB, TINUVIN® 144, and TINUVIN® 622 FB, commercially available from Ciba Geigy, UVINUL® 3048, commercially available from BASF, and the like, as well as mixtures thereof. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

The inks can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The inks in one specific embodiment have conductivity values of in one embodiment greater than $1 \times 10^{-8}$ Siemens per centimeter, in another embodiment greater than about $1.5 \times 10^{-8}$ Siemens per centimeter, in yet another embodiment greater than 1.0 about $2 \times 10^{-8}$ Siemens per centimeter, in still another embodiment greater than about $3 \times 10^{-8}$ Siemens per centimeter, in another embodiment greater than about $4 \times 10^{-8}$ Siemens per centimeter, in yet another embodiment greater than about $5 \times 10^{-8}$ Siemens per centimeter, and in still another embodiment greater than about $3.5 \times 10+^3$ Siemens per centimeter, although the conductivity can be outside of these ranges. Inks within these conductivity ranges are particularly useful in phase change ink printers wherein the ink level remaining in the machine is detecting by measuring the conductivity of the ink.

In embodiments wherein it is desired to increase the conductivity of the ink, conductivity agents can be included in the ink if so desired. Any desired or effective conductivity enhancing agent can be employed. Specific examples of suitable conductivity enhancing agents include complexes of dianilines, including dianiline and bis dianiline compounds, such as (1) 2,2'-dithio dianiline (Aldrich 16,676-6), (2) 4,4'-dithiodianiline (Aldrich 36,946-26), (3) 3,3'-methylene dianiline (Aldrich 37,826-7), (4) 4,4'-methylene dianiline (Aldrich 13,245-4), (5) N-methyl-4,4'-methylene dianiline (Aldrich 42,282-7), (6) 4,4'-methylene bis(2,6-diethyl aniline) (Aldrich 36,078-3), (7) 4,4'-methylene bis (2,6-diisopropyl-N,N-dimethylaniline) (Aldrich 40,353-9), (8) 4,4'-methylene bis (N,N-dimethylaniline) (Aldrich M4,445-1), (9) 4,4'-methylene bis (2,6-dimethylaniline) (Aldrich 36,079-1), (10) 4,4'-methylene bis (3-chloro-2,6-diethylaniline) (Aldrich 42,660-1), (11) 3,3'-(sulfonyl bis(4,1-phenylene))dianiline (Aldrich 44,095-7), (12) 4,4'-(1,3-phenylene diisopropylidene) bisaniline (Aldrich 45,048-0), and the like, as well as mixtures thereof, said dianilines being complexed with, for example, conductivity inducing phosphorous compounds such as phosphorus-containing acid compounds, with specific examples including (1) phenylphosphinic acid (Aldrich P2,880-8), (2) dimethylphosphinic acid (Aldrich 32,829-4), (3) methyl phosphonic acid (Aldrich 28,986-8), and the like, as well as mixtures thereof. Additional suitable conductivity enhancing agents include (1) (diethyl-(4-aminobenzyl) phosphonate (Aldrich 33,847-8), (2) diethyl-(phthalimidomethyl) phosphonate (Aldrich 36,622-6), (3) diethyl-(2,2,2-trifluoro-1-hydroxyethyl) phosphonate (Aldrich 43,982-7), (4) diphenyl succinimidyl phosphate (Aldrich 45,061-8), (5) dihexadecyl phosphate (Aldrich 27,149-7), (6) undecylenic acid zinc salt (hardness value 68; Aldrich 32,958-4), (7) zinc bis(2,2,6,6-tetramethyl-3,5-heptanedionate) (Aldrich 41,773-4), (8) zinc cyclohexanebutyrate (Aldrich 22,841-9), (9) zinc stearate (Aldrich 30,756-4), (10) methyl-1-adamantane sulfonate (Aldrich 40,956-1), (11) octadecyl-4-chlorobenzene sulfonate (Aldrich 47,799-0), (12) tetrabutylammonium trifluoromethanesulfonate (Aldrich 34,509-1), (13) S,S'-ethylene-ρ-toluene thiosulfonate (Aldrich 23,257-2), (14) pyridinium-3-nitrobenzene sulfonate (Aldrich 27,198-5), (15) ρ-toluene sulfonyl chloride (Aldrich 24,087-7), (16) o-toluene sulfonyl chloride (Aldrich 15,971-9), (17) 1-(ρ-toluene sulfonyl) imidazole (Aldrich 24,424-4), (18) 1-(ρ-toluene sulfonyl)-3-nitro-1,2,4-triazole (Aldrich 24,417-1), (19) 2,4,6-triisopropyl benzene sulfonyl chloride (Aldrich 11,949-0), (20) 1-(2,4,6-triisopropyl benzene sulfonyl) imidazole (Aldrich 40,948-0), (21) 1-(2,4,6-triisopropyl benzene sulfonyl)-3-nitro-1,2,4-triazole (Aldrich 40,948-0), (22) 4-nitrobenzene sulfonyl chloride (Aldrich 27,224-8), and the like, as well as mixtures thereof. The conductivity enhancing agent, when present, is present in the ink in any desired or effective amount, in one embodiment at least about 0.25 percent by weight of the ink, in another embodiment at least about 0.5 percent by weight of the ink, in yet another embodiment at least about 2 percent by weight of the ink, in still another embodiment at least about 8 percent by weight of the ink, and in another embodiment at least about 13 percent by weight, and in one embodiment no more than about 50 percent by weight of the ink, in another embodiment no more than about 45 percent by weight of the ink, in yet another embodiment no more than about 35 percent by weight of the ink, in still another embodiment no more than about 25 percent by weight of the ink, and in another embodiment no more than about 20 percent by weight of the ink, although the amount can be outside of these ranges.

Dyes used in the ink as auxiliary colorants can also be used to increase the conductivity of the ink.

The ink compositions in one embodiment have melting points no lower than about 50° C., in another embodiment no lower than about 70° C., and in yet another embodiment no lower than about 80° C., and in one embodiment have melting points no higher than about 160° C., in another embodiment no higher than about 140° C., and in yet another embodiment no higher than about 100° C., although the melting point can be outside of these ranges.

The ink compositions generally have melt viscosities at the jetting temperature (in one embodiment no lower than about 75° C., in another embodiment no lower than about 100° C., and in yet another embodiment no lower than about 120° C., and in one embodiment no higher than about 180° C., in another embodiment no higher than about 150° C., and in yet another embodiment no higher than about 130° C., although the jetting temperature can be outside of these ranges) in one embodiment of no more than about 30 centipoise, in another embodiment no more than about 20 centipoise, and in yet another embodiment no more than about 15 centipoise, and in one embodiment of no less than about 2 centipoise, in another embodiment no less than about 5 centipoise, and in yet another embodiment no less than about 7 centipoise, although the melt viscosity can be outside of these ranges.

The inks can be employed in apparatus for direct printing ink jet processes and in indirect (offset) printing ink jet applications. Another embodiment is directed to a process which comprises incorporating an ink of the present invention into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment is directed to a process which comprises incorporating an ink of the present invention into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In one specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. The inks can also be employed in other hot melt printing processes, such as hot melt acoustic ink jet printing, hot melt thermal ink jet printing, hot melt continuous stream or deflection ink jet printing, or the like. Phase change inks can also be used in printing processes other than hot melt ink jet printing processes, such as hot melt gravure printing, hot melt medical imaging printing, or the like.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like.

The inks are prepared by first admixing in an extruder the pigment particles with one of the ink carrier ingredients, which acts as a pigment dispersant, to prepare a pigment dispersion, wherein the extruder is maintained at a temperature that is above the peak crystallization temperature of the dispersant and below the peak melting temperature of the dispersant, followed by admixing the pigment dispersion with the additional ink carrier ingredients and any desired additional optional ingredients and subjecting the resulting mixture to high shear agitation to prepare the ink.

The pigment dispersion is prepared by admixing the pigment particles with one or more of the ink carrier ingredients having polar groups thereon. By "polar" is meant that the selected ink carrier ingredient has one or more functional groups thereon with a polarity higher than that of an unsubstituted hydrocarbon molecule (aliphatic, aromatic, or one having both aliphatic and aromatic portions), such as amide groups, ester groups, hydroxy groups, amine groups, carbonyl groups, carboxylic acid groups, urea groups, urethane groups, or the like, whereas a nonpolar ingredient would be an ink ingredient without any such functional groups thereon. For example, when the ink carrier contains a tetra-amide, the tetra-amide is a highly effective pigment dispersant. The ink carrier ingredient or mixture of ingredients with which the pigment is admixed is hereinafter referred to as the "dispersant".

The dispersant in one specific embodiment is reduced to powder form before admixing it with the pigment. While not required, reducing the dispersant to powder form renders the subsequent mixing easier to process, since a mixed homogenous powder mixture, when melted, places the pigment particles and the dispersant in close contact with each other. The dispersant in this embodiment can be reduced to powder of any desired or effective particle size, in one embodiment at least about 300 microns average particle diameter, in another embodiment at least about 425 microns average particle diameter, and in yet another embodiment at least about 600 microns average particle diameter, and in one embodiment no more than about 850 microns average particle diameter, as measured by sieving, although the dispersant particle size can be outside of these ranges.

The pigment and the dispersant are admixed in any desired or effective relative amounts, in one embodiment at least about 0.1 parts by weight dispersant per every 1 part by weight pigment, in another embodiment at least about 0.5 parts by weight dispersant per every 1 part by weight pigment, and in yet another embodiment at least about 3 parts by weight dispersant per every 1 part by weight pigment, and in one embodiment no more than about 20 parts by weight dispersant per every 1 part by weight pigment, in another embodiment no more than about 10 parts by weight dispersant per every 1 part by weight pigment, and in yet another embodiment no more than about 6 parts by weight dispersant per every 1 part by weight pigment, although the relative amounts can be outside of these ranges.

The relative amounts of pigment and dispersant can also, if desired, be selected so that at the extruder temperature the pigment/dispersant mixture has a viscosity sufficiently low to enable mixing in the extruder and also sufficiently high to enable a desirable degree of shear to be generated within the extruder. This viscosity value can be any desired or effective value, in one embodiment at least about 50 centipoise, in another embodiment at least about 100 centipoise, and in yet another embodiment at least about 200 centipoise, and in one embodiment no more than about 10,000 centipoise, in another embodiment no more than about 1,000 centipoise, and in yet another embodiment no more than about 600 centipoise, although the viscosity value of the mixture during the extrusion process can be outside of these ranges.

The pigment and the dispersant are then heated and admixed in an extruder. In embodiments wherein the dispersant is powderized prior to admixing with the pigment, the pigment particles and the dispersant particles can be mixed thoroughly before introducing them into the extruder. Any desired or effective extruder can be employed, including single screw extruders, twin screw extruders, including corotating twin screw extruders (wherein both screws rotate in the same direction), counterrotating twin screw extruders (wherein the screws rotate in opposite directions), and the like. Examples of suitable extruders include a fully intermeshing counter-rotating twin-screw DAVO extruder, Type VB.22.01, available from Reifenhäuser GmbH & Co., Troisdorf, Germany, which has a screw diameter of 22 millimeters and a length-to-diameter (L/D) ratio of 23.2, a fully intermeshing co-rotating ZSK-30 twin screw extruder, available from Werner & Pfleiderer Corporation, Ramsey, N.J., which has a screw diameter of 30.7 millimeters and a length-to-diameter (L/D) ratio in this example of 37.2, and the like. Examples of extruders are also disclosed in, for example, U.S. Pat. No. 4,894,308, U.S. Pat. No. 4,649,005, U.S. Pat. No. 4,110,844, and U.S. Pat. No. 4,894,308, the disclosures of each of which are totally incorporated herein by reference. Rotation speeds for counter-rotating extruders are in one embodiment at least about 40 rpm, and in one embodiment no more than about 100 rpm, although the rotation speed can be outside of these ranges. Rotation speeds for co-rotating extruders are in one embodiment at least about 50 rpm, and in one embodiment no more than about 500 rpm, although the rotation speed can be outside of these ranges.

The pigment and the dispersant are admixed in the extruder at a temperature that is at or above about the peak crystallization temperature of the dispersant and below about the peak melting temperature of the dispersant. The crystallization point of the dispersant is measured by differential scanning calorimetry (DSC). The molten material is allowed to cool in the DSC. A curve is plotted measuring heat flow (Watts per gram; y-axis) as a function of temperature (° C.; x-axis). The range between the onset of crystallization and the completion of crystallization, measured as the heat absorbed by the instrument, can be sharp or broad, depending on the crystalline or amorphous characteristics of the material. The peak of this curve is considered the peak crystallization point. For example, a material may exhibit a cooling transition range of from about 93° C. to about 46° C., with the maximum crystallization transition peak at about 85° C. Similarly, the melting point of the dispersant is measured by DSC by heating the solid material in the DSC and plotting a curve measuring heat flow as a function of temperature. Again, the range between the onset of melting and the completion of melting can be sharp or broad, depending on the crystalline or amorphous characteristics of the material. The peak of this curve is considered the peak melting point. For example, for the material having a cooling transition range of from about 93° C. to about 46° C., with the maximum cooling transition peak at about 85° C., the melting transition may be from about 52° C. to about 124° C., with the maximum melting transition peak at about 115° C. The peak crystallization temperature is below the peak melting temperature. Accordingly, for the inks disclosed herein, if the temperature selected for the extruder is based on the peak crystallization temperature of the dispersant, when the dispersant has a peak crystallization temperature of about 85° C. and a peak melting temperature of about 115° C., the extruder is maintained within a temperature range of from about 85° C. to about 115° C.

In one specific embodiment, the extruder is also maintained within a temperature range of at or above about the peak crystallization temperature to about 30 percent above the peak crystallization temperature. For instance, taking again the example of a dispersant with a peak crystallization temperature of about 85° C., the extruder is maintained within a temperature range of from about 85° C. to about 111° C. In another embodiment, the extruder is maintained within a temperature range of from about the peak crystallization temperature to about 20 percent above the peak crystallization temperature, and in yet another embodiment, the extruder is maintained within a temperature range of from about the peak crystallization temperature to about 10 percent above the peak crystallization temperature, although the temperature is not limited to these ranges.

In another specific embodiment, the extruder is also maintained within a temperature range of about 15 percent or more below the peak melting temperature. For instance, taking again the example of a dispersant with a peak melting temperature of about 115° C., the extruder is maintained within a temperature range of about 104° C. or lower. In another embodiment, the extruder is maintained within a temperature range of about 10 percent or more below the peak melting temperature, and in yet another embodiment, the extruder is maintained within a temperature range of about 20 percent or more below the peak melting temperature, although the temperature is not limited to these ranges. While not being limited to any particular theory, it is believed that by maintaining the temperature in the extruder within this range, the viscosity of the mixture can be maintained at a value sufficiently low to enable mixing of the ingredients and sufficiently high to enable mixing the ingredients under effectively high shear.

Subsequent to mixing the pigment and dispersant in the extruder, the resulting pigment dispersion generally (although not necessarily) is recovered from the extruder as a solid. Thereafter, the pigment dispersion is remelted (if recovered in solid form) or maintained in the molten state (if recovered in the liquid form). In one embodiment, the molten pigment dispersion is admixed with the other ingredients followed by subjecting the resulting molten ink composition to high shear mixing. In another embodiment, prior to addition of the other ink ingredients, the molten pigment dispersion is subjected to high shear mixing. In the embodiment wherein prior to addition of the other ink ingredients, the molten pigment dispersion is subjected to high shear mixing, prior to high shear mixing, additional dispersant (which is one or a mixture of two or more ink carrier ingredients having polar groups thereon) and, optionally, polyalkylene succinimide can be added to the pigment dispersion. The relative amounts of additional ingredients are selected so that the mixture has a viscosity sufficiently low to enable high shear mixing and also sufficiently high to enable a desirable degree of shear to be generated with the high shear mixer. This viscosity value can be any desired or effective value, in one embodiment at least about 1 centipoise, in another embodiment at least about 10 centipoise, and in yet another embodiment at least about 200 centipoise, and in one embodiment no more than about 100,000 centipoise, in another embodiment no more than about 10,000 centipoise, and in yet another embodiment no more than about 1,000 centipoise, although the viscosity value can be outside of these ranges.

In this specific embodiment, the pigment dispersion (including additional dispersant and optional polyalkylene succinimide if so desired) is then subjected to high shear mixing. Subsequent to high shear mixing of the pigment dispersion, any additional ink ingredients not present in the pigment dispersion can be added either while high shear mixing is continued or during a pause in the mixing followed by reinitiation of high shear mixing after these additional ingredients have been added, including ink ingredients having no polar groups, such as hydrocarbons and the like. Additional amounts of ink ingredients that are already present in the pigment dispersion can also be added at this time.

In embodiments wherein the molten pigment dispersion is admixed with the other ingredients without initial high shear mixing of the pigment dispersion, followed by subjecting the resulting molten ink composition to high shear mixing, some or all of the additional ink ingredients can be added to the molten pigment dispersion, followed by initiation of high shear mixing. For example, high shear mixing can be initiated after one or more additional ingredients have been added, with the high shear mixing continuing during addition of even more additional ingredients, or all of the additional ingredients can be added followed by high shear mixing.

In embodiments wherein the optional polyalkylene succinimide is present in the ink, this ingredient can be added at any point in the process prior to final high shear mixing of the ink ingredients, including prior to extrusion, subsequent to extrusion but prior to high shear mixing of the pigment dispersion, or subsequent to high shear mixing of the pigment dispersion and prior to or during high shear mixing of the remaining ink ingredients.

High shear conditions can be imposed upon the ink components by any desired or effective method, such as by use of a media mill, such as a Buhler media mill, an attritor, such as a Dispermat attritor, a microfluidizer, an impact homogenizer at high pressure (for example, about 10,000 psi in a confined chamber), including homogenizers made by Brinkman/KINEMATICA of Westbury, N.Y., such as the models PT 1200C, PT 1200CL, PT 10/35, PT2100, PT 1300D, PT 3100, PT 6100, and PT 1200B, a rotor/stator type high shear mixer operating with a tip speed in one embodiment of at least about 7 meters per second, and in another embodiment of at least about 12 meters per second, and in one embodiment of no more than about 30 meters per second, and in another embodiment of no more than about 25 meters per second, although the tip speed can be outside of these ranges, and in one embodiment at least about 1,000 rpm, in another embodiment at least about 5,000 rpm, and in yet another embodiment at least about 7,500 rpm, and in one embodiment no more than about 20,000 rpm, in another embodiment no more than about 15,000 rpm, and in yet another embodiment no more than about 12,500 rpm, although the rate can be outside of these ranges, such as those commercially available from IKA, Wilmington, N.C., such as the IKA Model UTC 65 (having a 65 millimeter rotor) and the IKA Model UTC T 115 KT (having a 115 millimeter rotor, a 7.5 HP motor, and a tip speed of 18 m/s at 60 Hz), and those commercially available from Quadro, such as the Quadro Model Y2 (having a 115 millimeter rotor, a 3 HO motor, and a tip speed of 19 m/s), and the like.

In one specific embodiment, the shear rate to which the ink ingredients are subjected is in one embodiment at least about 5,000 s$^{-1}$, and in another embodiment is no more than about 15,000 s$^{-1}$, although the shear rate can be outside of these ranges. Shear rate (s$^{-1}$) is defined as the relative velocity between two surfaces (meters per second) divided by the gap distance between them (meters). For example, if a rotor/stator type high shear mixer is used with a tip speed of from about 10 to about 30 meters per second and the gap between the rotor and stator is 2 millimeters (0.002 meters), the shear rate is from about 5,000 to about 15,000 s$^{-1}$. In one specific embodiment, the shear stress to which the ink ingredients are subjected is at least about 50 kilograms per meter, and in another embodiment is no more than about 150 kilograms per meter, although the shear stress can be outside of these ranges. Shear stress is defined as the product of the shear rate and the viscosity; for example, if the viscosity of the ink ingredients at a given temperature (for example, about 140° C.) is about 10 centipoise (0.01 kilograms per meter-second), the shear stress for a shear rate of from about 5,000 to about 15,000 s$^{-1}$ will be from about 50 to about 150 kilograms per meter.

The ink ingredients are subjected to high shear at a temperature at which the mixture of ingredients is molten, in one embodiment at least about 90° C., in another embodiment at least about 120° C., and in yet another embodiment at least about 130° C., and in one embodiment no more than about 180° C., in another embodiment no more than about 140° C., and in yet another embodiment no more than about 135° C., although the temperature can be outside of these ranges.

The ink ingredients are subjected to high shear for any desired or effective period of time, and will depend on the amount of material being sheared and the size of the mixer. For example, a 2.5 kilogram batch may be sheared for from about 3 to about 12 minutes, and an 18 kilogram batch may be sheared for from about 60 to about 90 minutes.

Subsequent to addition of all of the ink ingredients, high shear mixing is maintained for an additional effective period, in one embodiment at least about 9 minutes, in another embodiment at least about 12 minutes, and in yet another embodiment at least about 90 minutes, although the period of time can be outside of these ranges.

Thereafter, the mixture can, if desired, optionally be filtered. In a specific embodiment, the ink is filtered through one or more filters of sequentially smaller particle size to filter out undesirably large particles. In this specific embodiment, the ink has pigment particle sizes in one embodiment no larger than about 2 microns, in another embodiment no larger than about 1 micron, in yet another embodiment no larger than about 0.45 micron, and in still another embodiment no more than about 0.2 micron, although the pigment particle size can be outside of these ranges.

Specific embodiments will now be described in detail. These examples are intended to be illustrative, and the invention is not limited to the materials, conditions, or process parameters set forth in these embodiments. All parts and percentages are by weight unless otherwise indicated.

EXAMPLE A

Preparation of Pigment Dispersion A

A tetra-amide resin obtained from the reaction of one equivalent of a C-36 dimer acid obtained from Uniqema, New Castle, De with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference, which has a peak crystallization temperature of 85° C. and a peak melting temperature at 120° C., originally in the form of chips or chunks, was processed through a blender to powder form. Thereafter, 750.72 grams of the powderized tetra-amide resin and 239.7 grams of Special Black 4 carbon black (obtained from Degussa Canada, Burlington, Ontario) were admixed in a LITTLEFORD M5 blender for 30 minutes at 0.8 Amperes. Subsequently, the powder mixture was added at a rate of 1 pound per hour to a DAVO counter-rotating twin screw extruder (Model VS 104, obtained from Deutsche Apparate-Vertrieborganisation GmbH & Co, Troisdorf, Germany). The extruder had three temperature heating zones, all of which were set to the same temperature. The contents of the extruder were mixed at 80° C. and 50 rpm. The outlet temperature was set at 96° C.

EXAMPLE B

Preparation of Pigment Dispersion B

The process of Example A was repeated except that the extruder screw rotation rate was 80 rpm instead of 50 rpm.

EXAMPLE C

Preparation of Pigment Dispersion C

The process of Example A was repeated except that the extruder temperature was 90° C. instead of 80° C.

EXAMPLE D

Preparation of Pigment Dispersion D

The process of Example A was repeated except that the extruder temperature was 90° C. instead of 80° C. and the extruder screw rotation rate was 80 rpm instead of 50 rpm.

EXAMPLE E

Preparation of Pigment Dispersion E

The process of Example A was repeated except that the extruder temperature was 120° C. instead of 80° C.

EXAMPLE F

Preparation of Pigment Dispersion F

The process of Example A was repeated except that the extruder temperature was 120° C. instead of 80° C. and the extruder screw rotation rate was 80 rpm instead of 50 rpm.

EXAMPLE I

In a first 600 milliliter beaker were admixed and melted 61.98 grams of Pigment Dispersion A and 63.84 grams of stearyl stearamide (KEMAMIDE S-180, obtained from Witco, Humko Chemical Division, Memphis, Tenn.). This mixture was heated in an oven at 135° C. for 1 hour.

In a second 600 milliliter beaker (Beaker 2) were admixed and melted 123.93 grams of polyethylene wax (POLYWAX 655, obtained from Baker Petrolite, Lakewood, Ohio, of the formula $CH_3(CH_2)_{50}CH_3$)), 34.86 grams of a urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 14.79 grams of a urethane resin that was the adduct of three equivalents of stearyl isocyanate and a glycerol-based alcohol, prepared as described in Example 4 of U.S. Pat. No. 6,309,453, the disclosure of which is totally incorporated herein by reference, and 0.6 gram of NAUGARD N445 antioxidant (obtained from Uniroyal Chemical Co., Middlebury, Conn.). This mixture was heated in an oven at 135° C. for 1 hour and heated with stirring at 135° C. for 1 additional hour.

Thereafter, the contents of the second beaker were added to the contents of the first beaker and heating and stirring at 135° C. was continued for an additional 1 hour. Subsequently, the mixture was subjected to high shear with an IKA ULTRA TURAX T50 homogenizer at 10,000 rpm for 3 minutes with the temperature maintained below 140° C. The resulting ink composition was then filtered at 135° C. through a series of glass fiber disc filters from 10 micron down to 0.45 micron to remove from the ink any large particles.

EXAMPLE II

The process of Example I was repeated except that Pigment Dispersion B was used instead of Pigment Dispersion A.

EXAMPLE III

The process of Example I was repeated except that Pigment Dispersion C was used instead of Pigment Dispersion A.

EXAMPLE IV

The process of Example I was repeated except that Pigment Dispersion D was used instead of Pigment Dispersion A.

EXAMPLE V

The process of Example I was repeated except that Pigment Dispersion E was used instead of Pigment Dispersion A.

EXAMPLE VI

The process of Example I was repeated except that Pigment Dispersion F was used instead of Pigment Dispersion A.

EXAMPLE VII

In a first 600 milliliter beaker were admixed and melted 61.98 grams of Pigment Dispersion C and 63.84 grams of stearyl stearamide (KEMAMIDE S-180). This mixture was heated in an oven at 135° C. for 1 hour. Subsequently, the mixture was subjected to high shear with an IKA ULTRA TURAX T50 homogenizer at 10,000 rpm for 3 minutes with the temperature maintained below 140° C.

In a second 600 milliliter beaker (Beaker 2) were admixed and melted 123.93 grams of polyethylene wax (POLYWAX 655, obtained from Baker Petrolite, of the formula $CH_3(CH_2)_{50}CH_3$)), 34.86 grams of a urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 14.79 grams of a urethane resin that was the adduct of three equivalents of stearyl isocyanate and a glycerol-based alcohol, prepared as described in Example 4 of U.S. Pat. No. 6,309,453, the disclosure of which is totally incorporated herein by reference, and 0.6 gram of NAUGARD N445 antioxidant (obtained from Uniroyal Chemical Co., Middlebury, Conn.). This mixture was heated in an oven at 135° C. for 1 hour and heated with stirring at 135° C. for 1 additional hour.

Thereafter, the contents of the second beaker were added to the contents of the first beaker and high shear mixing at 8,000 rpm with the temperature maintained below 140° C. was continued for 3 minutes. The resulting ink composition was then filtered at 135° C. through a series of glass fiber disc filters from 10 micron down to 0.45 micron to remove from the ink any large particles.

EXAMPLE VIII

The process of Example VII was repeated except that high shear mixing of the first beaker was carried out at 10,000 rpm for 9 minutes instead of 3 minutes, and except that high shear mixing of the combined contents of both beakers was carried out at 8,000 rpm for 9 minutes instead of 3 minutes.

The above inks were filtered through a 0.45 micron filter to remove large particles and to determine the quality of the pigment dispersion. The inks and the percentage of each ink that was filtered successfully is indicated in the table below:

| Ink | Dispersion | Extruder Temp. (° C.) | Extruder rpm | High Shear Mixing Time (minutes) | % of ink filtered at 0.45µ |
|---|---|---|---|---|---|
| I | A | 80 | 50 | 3 | 11.5 |
| II | B | 80 | 80 | 3 | 0 |

-continued

| Ink | Dispersion | Extruder Temp. (° C.) | Extruder rpm | High Shear Mixing Time (minutes) | % of ink filtered at 0.45μ |
|-----|------------|----------------------|--------------|----------------------------------|----------------------------|
| III | C | 90 | 50 | 3 | 62.6 |
| IV | D | 90 | 80 | 3 | 40.6 |
| V | E | 120 | 50 | 3 | 13.1 |
| VI | F | 120 | 80 | 3 | 0 |
| VII | C | 90 | 50 | 3 | 80 |
| VIII | C | 90 | 50 | 9 | 100 |

When the extruder temperature was 120° C. (Inks V and VI), the dispersant tetra-amide melted to form a liquid that was effective in wetting the pigment particles but not effective to break down pigment particle agglomerates because of low shearing forces generated in the extruder. The resulting inks (Inks V and VI) had poor pigment particle size distribution and large pigment agglomerates, and were difficult to filter through the 0.45μ filter.

When the extruder temperature was 80° C. (Inks I and II), most of the dispersant tetra-amide crystallized out of the dispersion, causing poor wetting of the pigment particles in the extruder. The resulting inks (Inks I and II) were difficult to filter through the 0.45μ filter.

When the extruder temperature was 90° C. (Inks III and IV), most of the dispersant tetra-amide crystallized out of the dispersion; high shear forces generated in the extruder, however, were able to soften the tetra-amide dispersant sufficiently to enable wetting of the pigment particles and good dispersion of the pigment within the dispersion. The resulting inks (Inks III and IV) gave improved filtration results.

When the extruder temperature was 90° C. and additional high shear mixing was carried out on the pigment dispersion prior to addition of the additional ink ingredients (Inks VII and VIII), the inks exhibited substantially improved filtration results. These inks, when incorporated into a XEROX® PHASER 850 phase change ink jet printer, exhibited excellent jetting performance and generated prints with good optical density and high print quality.

EXAMPLE IX

The processes of Examples III, IV, VII, and VIII are repeated except that in each case, Beaker 1 contains, in addition to 61.98 grams of Pigment Dispersion A and 63.84 grams of stearyl stearamide, 2.5 grams of Oronite OLOA 11000 (polyisobutylene succinimide, available from Chevron, Belle Chasse, La.). It is believed that these inks will show further improved performance in that heat stability of the inks will be increased as measured by aging the inks in an oven at 135° C. for 1 week, filtering the aged inks through a 0.45 micron glass fiber filter under a constant pressure of 15 psi, and comparing the time for the aged ink to filter through the 0.45 micron filter to the time for the unaged ink to filter through the 0.45 micron filter.

Other embodiments and modifications may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A process for preparing a phase change ink composition which comprises (a) a phase change ink carrier, said carrier comprising at least one nonpolar component and at least one polar component, and (b) pigment particles, said process comprising (1) selecting at least one of the polar carrier components to be a pigment particle dispersant; (2) admixing the pigment particles with the dispersant; (3) extruding the mixture of pigment particles and dispersant in an extruder at a temperature that is at or above about the peak crystallization temperature of the dispersant and below about the peak melting temperature of the dispersant, thereby forming a pigment dispersion; (4) subsequent to extrusion of the pigment dispersion, adding to the pigment dispersion any remaining polar components and the nonpolar component; and (5) subjecting the resulting mixture of pigment dispersion, polar component, and nonpolar component to high shear mixing to form the ink.

2. A process according to claim 1 wherein the dispersant is a tetra-amide, a monoamide, a urethane, or a mixture thereof.

3. A process according to claim 1 wherein the dispersant is a tetra-amide.

4. A process according to claim 1 wherein the dispersant is a tetra-amide of the formula

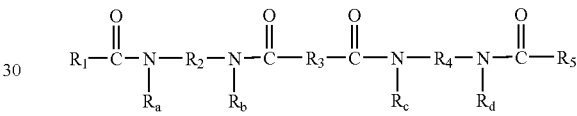

wherein (1) $R_a$, $R_b$, $R_c$, and $R_d$ each, independently of the others, is (a) a hydrogen atom, (b) an alkyl group, (c) an aryl group, (d) an arylalkyl group, or (e) an alkylaryl group, (2) $R_2$, $R_3$, and $R_4$ each, independently of the others, are (a) an alkylene group, (b) an arylene group, (c) an arylalkylene group, or (d) an alkylarylene group, and (3) $R_1$ and $R_5$ each, independently of the other, is (a) an alkyl group, (b) an aryl group, (c) an arylalkyl group, or (d) an alkylaryl group.

5. A process according to claim 4 wherein at least one of the alkyl, alkylene, aryl, arylene, arylalkyl, arylalkylene, alkylaryl, and alkylarylene groups is substituted.

6. An ink according to claim 4 wherein none of the alkyl, alkylene, aryl, arylene, arylalkyl, arylalkylene, alkylaryl, and alkylarylene groups are substituted.

7. An ink according to claim 4 wherein at least one of the alkyl, alkylene, aryl, arylene, arylalkyl, arylalkylene, alkylaryl, and alkylarylene groups has at least one hetero atom therein.

8. An ink according to claim 7 wherein the one or more hetero atom is oxygen, nitrogen, sulfur, silicon, phosphorus, or a mixture thereof.

9. An ink according to claim 4 wherein none of the alkyl, alkylene, aryl, arylene, arylalkyl, arylalkylene, alkylaryl, and alkylarylene groups have hetero atoms therein.

10. An ink according to claim 4 wherein $R_1$ and $R_5$ are both —$(CH_2)_{16}CH_3$, $R_2$ and $R_4$ are each —$CH_2CH_2$—, and $R_3$ is a branched unsubstituted alkylene group having about 34 carbon atoms.

11. An ink according to claim 4 wherein $R_1$ and $R_5$ are both —$(CH_2)_nCH_3$ wherein n is 47 or 48, $R_2$ and $R_4$ are each —$CH_2CH_2$—, and $R_3$ is a branched unsubstituted alkylene group having about 34 carbon atoms.

12. A process according to claim 1 wherein the dispersant is a dimer acid based tetra-amide that is the reaction product of dimer acid, ethylene diamine, and a long chain hydrocarbon having greater than thirty six carbon atoms and having a terminal carboxylic acid group.

13. A process according to claim 1 wherein the nonpolar component is a polyethylene wax.

14. A process according to claim 1 wherein the nonpolar component comprises a polyethylene wax, the polar component comprises a tetra-amide, a monoamide, and a urethane, and the dispersant is a tetra-amide.

15. A process according to claim 1 wherein the phase change ink carrier comprises (1) stearyl stearamide, present in the carrier in an amount of at least about 8 percent by weight, and present in the carrier in an amount of no more than about 32 percent by weight, (2) a dimer acid based tetra-amide that is the reaction product of dimer acid, ethylene diamine, and a long chain hydrocarbon having greater than thirty six carbon atoms and having a terminal carboxylic acid group, present in the carrier in an amount of at least about 10 percent by weight, and present in the carrier in an amount of no more than about 32 percent by weight, (3) a polyethylene wax, present in the carrier in an amount of at least about 25 percent by weight, and present in the carrier in an amount of no more than about 60 percent by weight, (4) a urethane resin derived from the reaction of two equivalents of hydroabietyl alcohol and one equivalent of isophorone diisocyanate, present in the carrier in an amount of at least about 6 percent by weight, and present in the carrier in an amount of no more than about 16 percent by weight, (5) a urethane resin that is the adduct of three equivalents of stearyl isocyanate and a glycerol-based alcohol, present in the carrier in an amount of at least about 2 percent by weight, and present in the carrier in an amount of no more than about 13 percent by weight, and (6) an antioxidant, present in the carrier in an amount of at least about 0.01 percent by weight, and present in the carrier in an amount of no more than about 1 percent by weight.

16. A process according to claim 1 wherein the ink further contains a polyalkylene succinimide.

17. A process according to claim 16 wherein the polyalkylene succinimide is of the formula

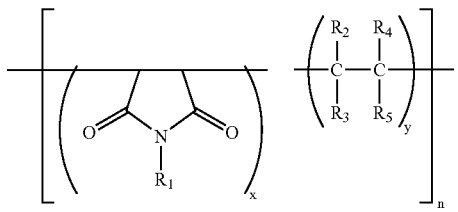

wherein x is an integer representing the number of repeat succinimide units, y is an integer representing the number of repeat alkylene units, n is an integer, $R_1$ is an alkyl group, an aryl group, an arylalkyl group, or an alkylaryl group, and $R_2$, $R_3$, $R_4$, and $R_5$ each, independently of the others, is a hydrogen atom or an alkyl group.

18. A process according to claim 17 wherein x is from 1 to about 3, y is from 1 to about 3, n is at least about 2, and n is no more than about 500.

19. A process according to claim 17 wherein at least one of the alkyl, aryl, arylalkyl, and alkylaryl groups is substituted.

20. A process according to claim 17 wherein none of the alkyl, aryl, arylalkyl, and alkylaryl groups are substituted.

21. A process according to claim 17 wherein at least one of the alkyl, aryl, arylalkyl, and alkylaryl groups has at least one hetero atom therein.

22. A process according to claim 21 wherein the one or more hetero atom is oxygen, nitrogen, sulfur, silicon, phosphorus, or a mixture thereof.

23. A process according to claim 17 wherein none of the alkyl, aryl, arylalkyl, and alkylaryl groups have hetero atoms therein.

24. A process according to claim 17 wherein $R_2$, $R_3$, and $R_4$ are hydrogen atoms and $R_5$ is an alkyl group.

25. A process according to claim 17 wherein $R_2$ and $R_3$ are hydrogen atoms and $R_4$ and $R_5$ are methyl groups.

26. A process according to claim 16 wherein the polyalkylene succinimide is polyisobutylene succinimide.

27. A process according to claim 16 wherein the polyalkylene succinimide is present in the ink in an amount of at least about $1 \times 10^{-7}$ percent by weight of the ink.

28. A process according to claim 16 wherein the polyalkylene succinimide is present in the ink in an amount of at least about $1 \times 10^{-5}$ percent by weight of the ink.

29. A process according to claim 16 wherein the polyalkylene succinimide is present in the ink in an amount of at least about 0.001 percent by weight of the ink.

30. A process according to claim 16 wherein the polyalkylene succinimide is present in the ink in an amount of at least about 0.005 percent by weight of the ink.

31. A process according to claim 16 wherein the polyalkylene succinimide is present in the ink in an amount of at least about 0.01 percent by weight of the ink.

32. A process according to claim 16 wherein the polyalkylene succinimide is present in the ink in an amount of no more than about 40 percent by weight of the ink.

33. A process according to claim 16 wherein the polyalkylene succinimide is present in the ink in an amount of no more than about 30 percent by weight of the ink.

34. A process according to claim 16 wherein the polyalkylene succinimide is present in the ink in an amount of no more than about 20 percent by weight of the ink.

35. A process according to claim 16 wherein the polyalkylene succinimide is present in the ink in an amount of no more than about 10 percent by weight of the ink.

36. A process according to claim 1 wherein the pigment particles have acidic functional groups on the surfaces thereof.

37. A process according to claim 1 wherein the pigment particles have basic functional groups on the surfaces thereof.

38. A process according to claim 1 wherein the pigment is present in the ink in an amount of at least about 0.1 percent by weight of the ink.

39. A process according to claim 1 wherein the pigment is present in the ink in an amount of at least about 0.2 percent by weight of the ink.

40. A process according to claim 1 wherein the pigment is present in the ink in an amount of at least about 0.5 percent by weight of the ink.

41. A process according to claim 1 wherein the pigment is present in the ink in an amount of no more than about 50 percent by weight of the ink.

42. A process according to claim 1 wherein the pigment is present in the ink in an amount of no more than about 20 percent by weight of the ink.

43. A process according to claim 1 wherein the pigment is present in the ink in an amount of no more than about 10 percent by weight of the ink.

44. A process according to claim 1 wherein the ink further contains a dye.

45. A process according to claim 44 wherein the dye is a phthalocyanine.

46. A process according to claim 1 wherein the pigment particles and the dispersant in powder form are admixed prior to mixing in the extruder.

47. A process according to claim 1 wherein the relative amounts of pigment particles and dispersant in the extruder are at least about 0.1 parts by weight dispersant per every 1 part by weight pigment.

48. A process according to claim 1 wherein the relative amounts of pigment particles and dispersant in the extruder are no more than about 20 parts by weight dispersant per every 1 part by weight pigment.

49. A process according to claim 1 wherein the viscosity of the mixture of pigment particles and dispersant in the extruder is at least about 10 centipoise.

50. A process according to claim 1 wherein the viscosity of the mixture of pigment particles and dispersant in the extruder is no more than about 10,000 centipoise.

51. A process according to claim 1 wherein the viscosity of the mixture of pigment particles and dispersant in the extruder is no more than about 1,000 centipoise.

52. A process according to claim 1 wherein the extruder is operated at a screw rotation rate of at least about 40 rpm.

53. A process according to claim 1 wherein the extruder is operated at a screw rotation rate of no more than about 100 rpm.

54. A process according to claim 1 wherein the extruder is maintained within a temperature range of from about the peak crystallization temperature to about 30 percent above the peak crystallization temperature and below about the peak melting temperature of the dispersant.

55. A process according to claim 1 wherein the extruder is maintained within a temperature range of from about the peak crystallization temperature to about 20 percent above the peak crystallization temperature and below about the peak melting temperature of the dispersant.

56. A process according to claim 1 wherein the extruder is maintained within a temperature range of from about the peak crystallization temperature to about 10 percent above the peak crystallization temperature and below about the peak melting temperature of the dispersant.

57. A process according to claim 1 wherein the extruder is maintained within a temperature range of about 10 percent or more below the peak melting temperature and at or above about the peak crystallization temperature of the dispersant.

58. A process according to claim 1 wherein the extruder is maintained within a temperature range of about 15 percent or more below the peak melting temperature and at or above about the peak crystallization temperature of the dispersant.

59. A process according to claim 1 wherein the extruder is maintained within a temperature range of about 20 percent or more below the peak melting temperature and at or above about the peak crystallization temperature of the dispersant.

60. A process according to claim 1 wherein, subsequent to extrusion of the pigment dispersion and prior to adding to the pigment dispersion any remaining polar components and the nonpolar component, the pigment dispersion is subjected to high shear mixing.

61. A process according to claim 60 wherein the viscosity of the pigment dispersion during high shear mixing is at least about 200 centipoise.

62. A process according to claim 60 wherein the viscosity of the pigment dispersion during high shear mixing is no more than about 10,000 centipoise.

63. A process according to claim 60 wherein the viscosity of the pigment dispersion during high shear mixing is no more than about 1,000 centipoise.

64. A process according to claim 60 wherein the pigment dispersion is subjected to high shear mixing with a rotor/stator mixer operating with a tip speed of at least about 7 meters per second.

65. A process according to claim 60 wherein the pigment dispersion is subjected to high shear mixing with a rotor/stator mixer operating with a tip speed of at least about 12 meters per second.

66. A process according to claim 60 wherein the pigment dispersion is subjected to high shear mixing with a rotor/stator mixer operating at least about 1,000 rpm.

67. A process according to claim 60 wherein the pigment dispersion is subjected to high shear mixing with a rotor/stator mixer operating at least about 5,000 rpm.

68. A process according to claim 60 wherein the pigment dispersion is subjected to high shear mixing with a rotor/stator mixer operating at least about 7,500 rpm.

69. A process according to claim 60 wherein the pigment dispersion is subjected to high shear mixing at a shear rate of at least about 5,000 s$^{-1}$.

70. A process according to claim 60 wherein the pigment dispersion is subjected to high shear mixing at a shear stress of at least about 50 kilograms per meter.

71. A process according to claim 1 wherein the mixture of pigment dispersion, polar component, and nonpolar component is subjected to high shear mixing with a rotor/stator mixer operating with a tip speed of at least about 7 meters per second.

72. A process according to claim 1 wherein the mixture of pigment dispersion, polar component, and nonpolar component is subjected to high shear mixing with a rotor/stator mixer operating with a tip speed of at least about 12 meters per second.

73. A process according to claim 1 wherein the mixture of pigment dispersion, polar component, and nonpolar component is subjected to high shear mixing with a rotor/stator mixer operating at least about 1,000 rpm.

74. A process according to claim 1 wherein the mixture of pigment dispersion, polar component, and nonpolar component is subjected to high shear mixing with a rotor/stator mixer operating at least about 5,000 rpm.

75. A process according to claim 1 wherein the mixture of pigment dispersion, polar component, and nonpolar component is subjected to high shear mixing with a rotor/stator mixer operating at least about 7,500 rpm.

76. A process according to claim 1 wherein the mixture of pigment dispersion, polar component, and nonpolar component is subjected to high shear mixing at a shear rate of at least about 5,000 s$^{-1}$.

77. A process according to claim 1 wherein the mixture of pigment dispersion, polar component, and nonpolar component is subjected to high shear mixing at a shear stress of at least about 50 kilograms per meter.

78. A process for preparing a phase change ink composition which comprises (a) a phase change ink carrier, said carrier comprising at least one nonpolar component and at least one polar component, said polar component comprising a tetra-amide, and (b) pigment particles, said process comprising (1) admixing the pigment particles with the tetra-amide; (2) extruding the mixture of pigment particles and tetra-amide in an extruder at a temperature that is at or above about the peak crystallization temperature of the tetra-amide and below about the peak melting temperature of the tetra-amide, thereby forming a pigment dispersion; (3)

subsequent to extrusion of the pigment dispersion, adding to the pigment dispersion any remaining polar components and the nonpolar component; and (4) subjecting the resulting mixture of pigment dispersion, polar component, and nonpolar component to high shear mixing to form the ink.

79. A process according to claim 78 wherein the ink further contains a polyalkylene succinimide.

80. A process for preparing a phase change ink composition which comprises (a) a phase change ink carrier, said carrier comprising at least one nonpolar component and at least one polar component, said polar component comprising a tetra-amide, and (b) pigment particles, said pigment particles having either acidic groups or basic groups on the surfaces thereof, said process comprising (1) admixing the pigment particles with the tetra-amide; (2) extruding the mixture of pigment particles and tetra-amide in an extruder at a temperature that is at or above about the peak crystallization temperature of the tetra-amide and below about the peak melting temperature of the tetra-amide, thereby forming a pigment dispersion; (3) subsequent to extrusion of the pigment dispersion, subjecting the pigment dispersion to high shear mixing; and (4) subsequent to high shear mixing of the pigment dispersion, adding to the pigment dispersion any remaining polar components and the nonpolar component while continuing high shear mixing, thereby forming the ink.

* * * * *